United States Patent
Haberman

(10) Patent No.: US 9,998,777 B2
(45) Date of Patent: *Jun. 12, 2018

(54) SYSTEMS AND METHODS FOR DYNAMIC BIT/BANDWIDTH ALLOCATION

(71) Applicant: VISIBLE WORLD, INC., New York, NY (US)

(72) Inventor: Seth Haberman, New York, NY (US)

(73) Assignee: Visible World, Inc., New York, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/536,885

(22) Filed: Nov. 10, 2014

(65) Prior Publication Data

US 2015/0067725 A1    Mar. 5, 2015

Related U.S. Application Data

(63) Continuation of application No. 12/156,725, filed on Jun. 4, 2008, now Pat. No. 8,887,195.

(Continued)

(51) Int. Cl.
| | |
|---|---|
| *H04N 21/24* | (2011.01) |
| *H04L 12/28* | (2006.01) |
| *H04L 12/24* | (2006.01) |
| *H04L 12/26* | (2006.01) |
| *H04L 12/923* | (2013.01) |
| *H04L 12/911* | (2013.01) |

(Continued)

(52) U.S. Cl.
CPC ..... *H04N 21/2402* (2013.01); *H04L 12/2801* (2013.01); *H04L 41/0896* (2013.01); *H04L 43/0882* (2013.01); *H04L 47/70* (2013.01); *H04L 47/762* (2013.01); *H04L 47/822* (2013.01); *H04L 67/16* (2013.01); *H04L 67/26* (2013.01); *H04N 21/235* (2013.01); *H04N 21/2385* (2013.01); *H04N 21/2547* (2013.01); *H04N 21/25866* (2013.01); *H04N 21/812* (2013.01); *H04L 41/509* (2013.01); *H04L 41/5051* (2013.01); *H04L 67/306* (2013.01)

(58) Field of Classification Search
CPC ............. H04L 12/2801; H04L 12/5695; H04L 41/0896; H04L 41/5051; H04L 41/509; H04L 43/0882; H04L 47/762; H04L 47/822; H04L 67/16; H04L 67/306; H04L 67/26; H04L 47/70; H04N 21/2402; H04N 21/812; H04N 21/235; H04N 21/2385; H04N 21/2547; H04N 21/25866; H04N 21/5051; H04N 21/509; H04N 21/306

See application file for complete search history.

(56) References Cited

U.S. PATENT DOCUMENTS 6,438,141 B1 *    8/2002    Hanko ................... H04J 3/1682
                                                        370/252
6,611,503 B1 *    8/2003    Fitzgerald et al. ........... 370/260

(Continued)

*Primary Examiner* — Chenea Smith
(74) *Attorney, Agent, or Firm* — Baker & Hostetler LLP

(57) ABSTRACT

Embodiments of the present invention include systems and methods enabling the send or "push" side of a cable transmission to dynamically obtain additional and/or temporary capacity. Bits and/or bandwidth of transmitted content is restricted by the service provider allowing gaps in the capacity to be filled with value-added content such as advertising, additional supplemental data feeds, or other media content.

22 Claims, 4 Drawing Sheets

Related U.S. Application Data

(60) Provisional application No. 60/933,024, filed on Jun. 4, 2007.

(51) Int. Cl.
*H04N 21/81* (2011.01)
*H04L 29/08* (2006.01)
*H04N 21/235* (2011.01)
*H04N 21/2385* (2011.01)
*H04N 21/2547* (2011.01)
*H04N 21/258* (2011.01)

(56) References Cited

U.S. PATENT DOCUMENTS

| | | | |
|---|---|---|---|
| 6,771,644 B1* | 8/2004 | Brassil et al. | 370/390 |
| 2002/0083444 A1* | 6/2002 | Blasko et al. | 725/35 |
| 2005/0022247 A1* | 1/2005 | Bitran | H04L 12/2801 |
| | | | 725/111 |
| 2007/0076728 A1* | 4/2007 | Rieger et al. | 370/401 |
| 2007/0116048 A1* | 5/2007 | Addington | H04J 3/16 |
| | | | 370/468 |
| 2007/0121678 A1* | 5/2007 | Brooks | H04L 12/2801 |
| | | | 370/505 |
| 2007/0250901 A1* | 10/2007 | McIntire | H04N 7/17318 |
| | | | 725/146 |

* cited by examiner

SYSTEMS AND METHODS FOR DYNAMIC BIT/BANDWIDTH ALLOCATION

CROSS REFERENCE TO RELATED APPLICATIONS

This application is a continuation application of U.S. application Ser. No. 12/156,725, filed Jun. 4, 2008, which claims the benefit of U.S. Provisional Appln. No. 60/933,024, filed Jun. 4, 2007, the entire disclosures of which are incorporated herein in their entireties.

FIELD OF INVENTION

The present invention generally relates to cable transmission, and more specifically to methods and systems dynamic bit/bandwidth allocation.

BACKGROUND

Cable operators and vendors, such as Big Band, Motorola, Cisco, and Imagine Communications, have developed and are further refining systems to measure bit/bandwidth demand or "pull" by cable consumers and allocate capacity within a cable plant node on a real-time dynamic basis. These types of systems are referred to as "switched digital video" systems. Switched digital video ("SDV") systems are being implemented to resolve growing consumer demand of cable bit/bandwidth. With hundreds of possible television channels and an increasing number of high-definition ("HD") channels, cable service providers are being stretched to the limits of their network capacity in order to provide uninterrupted, quality service to their subscribers. In addition to audio and video data transmitted for television services, many providers also package Internet, Video-on-demand and digital telephone services to subscribers—all within the same cable infrastructure.

To accommodate the increased demand for bits/bandwidth, cable providers limit the transmission of a particular channel until it is requested by a subscriber. For example, a certain channel is not constantly broadcasts cat a home, or neighborhood. When a subscriber tunes to that channel on the digital set-top box, a signal is sent to the cable provider to "turn-on" the channel. The provider then transmits the stream of data containing that channel's video and audio through the cable toy the set-top box and on to the subscriber's televisions. Should a second subscriber in the same service area call up that same channel, the stream is forwarded on to that set top ho eliminating the need for a second stream of the same channel.

The transmission speeds of signals over the cable lines is fast enough that the subscriber is unaware that seconds before tuning to that station, the station was not being broadcast at all.

Hybrid SDV systems provide for the more popular channels such as broadcast networks and popular networks (e.g. ESPN, CNN, etc.) to be constantly broadcast to a home, while less popular channels would be handled in much the same way as a video-on-demand (VOD) session except that instead of having the characteristics of a unicast (only one-to-one) transmissions, it would have the characteristics of a multicast transmission (2nd, 3rd, etc. viewers of a programs channel would be joined to the stream initiate into the node by the 1st viewer). Thus, more popular channels would always be available while channels which are switched would only be available (similarly to VOD) when bandwidth is available.

Further, as the cable plant is transmitting both the Moving Picture Experts Group (MPEG) data (for typical video programming) and Internet Protocol (IP) data, some vendors and cable operators are designing for bandwidth to also be dynamically allocated on a shared basis between IP uses and MPEG uses.

Current switched digital video systems are designed to alleviate and overcome bandwidth transmission limitations from the consumer on a "pull" basis (i.e., dynamically allocating bandwidth based upon subscriber usage and demand). There remains an untapped resource for advertisers and cable providers alike in adapting a dynamic bandwidth allocation protocol on a "push" basis to opportunistically exploit the gaps or holes in the available bandwidth. That is dynamically allocating additional, unused bandwidth to certain channels for the inclusion of additional services, such as advanced advertising and content delivery

SUMMARY OF THE INVENTION

Embodiments of the present invention include systems and methods enabling the send or "push" side of a cable transmission to dynamically obtain additional and/or temporary bandwidth. Bandwidth of transmitted content is restricted by the service provider allowing gaps in the bandwidth to be filled with value-added content such as advertising, additional supplemental data feeds, or other media content.

Some embodiments may use additional bandwidth to enable the simultaneous transmission of multiply possible advertising/promotional versions. Whether the advertising versions are pre-constructed or created and assembled upon final delivery, the use of extra bandwidth provides an opportunity for expanded content delivery. Further embodiments of the invention include multiple feeds or streams of data, combined at a receiver to provide an interactive, multi-faceted viewing experience to a content subscriber.

Another embodiment of the invention includes a method for dynamically monitoring and distributing bandwidth over a content delivery network. A monitoring agent detects available bandwidth and re-allocates the bandwidth to certain channels based upon a rules engine. The rules engine may determine, without limitation, which channels receive the expanded bandwidth, what times the expanded bandwidth is available to a channel, time limits or expirations of the expanded bandwidth availability, etc.

Embodiments of the present invention include the ability for cable operators, other broadcast service providers, such as the internet, digital telephone, video on demand, etc., to exploit available bandgaps in a broadcast network to increase value for content providers such as advertisers, broadcast networks, cable channels, Internet sites, and other service providers by expanding the quantity, quality, and content provided to a subscriber.

BRIEF DESCRIPTION OF THE DRAWINGS

These embodiments and other aspects of this invention will be readily apparent from the detailed description below and the appended drawings, which are meant to illustrate and not to limit the invention, and in which.

DETAILED DESCRIPTION

The invention will be more completely understood through the following detailed description, which should be read in conjunction with the attached drawings. Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the field to variously employ the invention in virtually any appropriately detailed embodiment.

Figure 1:
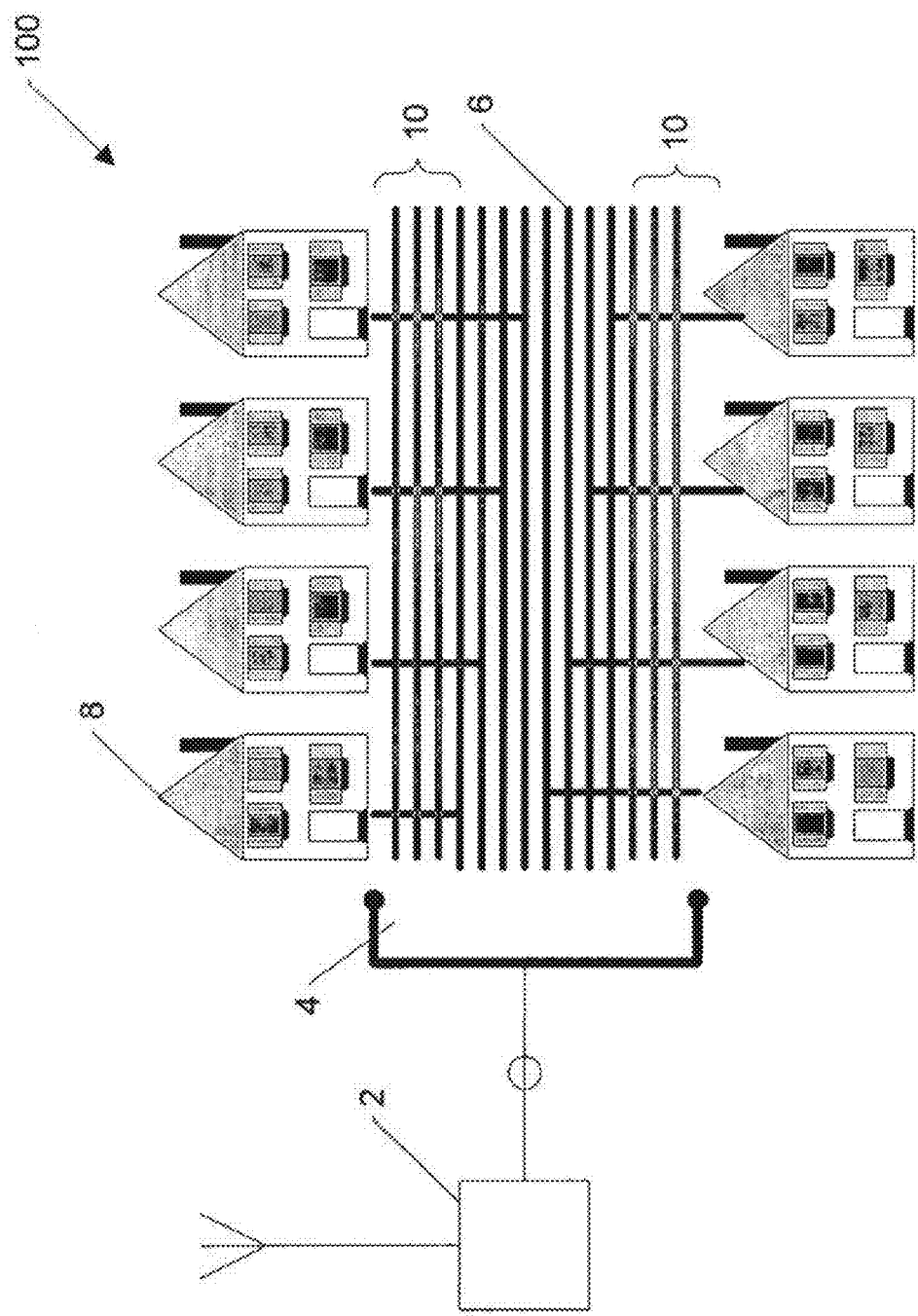
FIG. 1 is a diagram of a traditional broadcast type cable delivery system.

Contrary to a system in which the consumers bandwidth pull drives the bandwidth allocation, embodiments of the invention include a "push" based dynamic allocation to create additional value in the services provided by a cable operator. Turning now to FIG. 1, a high-level diagram of a traditional cable provider system 100 is depicted. A cable company 2 transmits audio and video data over a network of cables to a neighborhood or service area. The bandwidth 4 of the cable provider is limited in that each channel requires a dedicated portion (typically a 6 MHz band) of the bandwidth. In a traditional broadcast type system, all channels 6 offered by the provider are broadcast at all times over the network. Even though subscriber house (or more) are watching a particular channel (shown as a connection to a particular house 8), the remaining unviewed 10 channels available are still transmitted over the cable network, using valuable bandwidth for channels that are never seen. Such a transmission system limits the number of channels, quality of channels and types of services a provider can offer to a subscriber, without degrading the quality of service.

Figure 2:
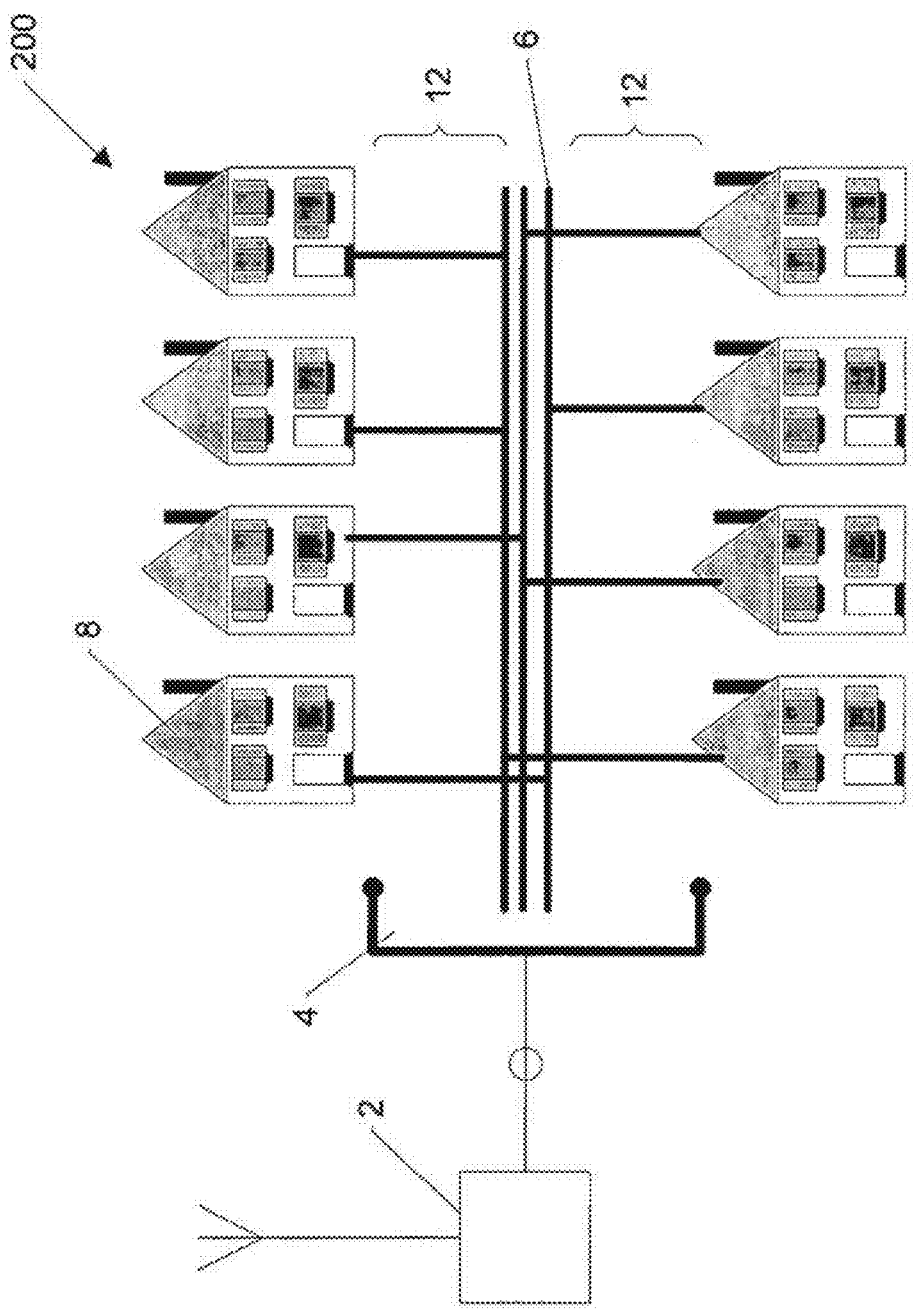
FIG. 2 is a diagram of a digital switched video cable delivery system in accordance with an embodiment of the invention.

Alternatively, as depicted in FIG. 2, a switched video system 200 dynamically allocates the bandwidth 4 of the system based upon an instantaneous determination of the demand of the provider's resources. In a similar neighborhood or service area only the channels to which the subscribers are currently tuned are broadcast. For example, a subscriber may tune his digital set-top box to a network broadcast channel by pressing a key on remote control. The set-top box, upon receiving the signal from the remote control, sends a request to the cable provider. The request is answered by the cable provider 2 opening up the channel and broadcasting the channel data to the network and to the subscriber's set-top box. A second subscriber may time to a different channel, in which the cable provider responds to the demand for the channel by transmitting the channel to the second subscriber's house. If no subscriber within the service area has requested a channel, the data corresponding to that channel is not transmitted. If a third subscriber, in this example, tunes her set top box to the same network as the first subscriber, the cable provider joins the third subscriber into the transmission of the channel that is already being sent for the first subscriber, with no additional bandwidth required.

A switched digital video system leaves portions of the bandwidth 12 open when demand for the provider's resources is low. When demand for a channel or multiple channels is high, the provider can dynamically allocate the unused bandwidth to alleviate stress on the system. Such an arrangement also allows the providers to offer additional services (e.g. Internet, video-on-demand, digital telephone) and increased quality for those services that would otherwise be unreliable or unavailable due to bandwidth limitations.

According to one embodiment of the invention, a "push" side system dynamically allocates the unused and available bandwidth for increased value of broadcast transmissions based on a set or criteria or rules contained within a rules engine. When unused gaps or holes in the broadband spectrum are available, the system utilizes the availability of additional bandwidth allowing expanded broadband use by broadcast and cable networks, advertisers, Internet applications or gather media content providers. When the system determines if and how much bandwidth is available, the system dynamically reallocates the bandwidth to certain channels or services based on the definitions in the rules engine. As detailed below, the inks by which the bandwidth may be allocated may include, without limitation, pre-purchased, or positioned advertisements, multiple feeds of different camera angles, Internet based streams or services, etc.

Figure 3:
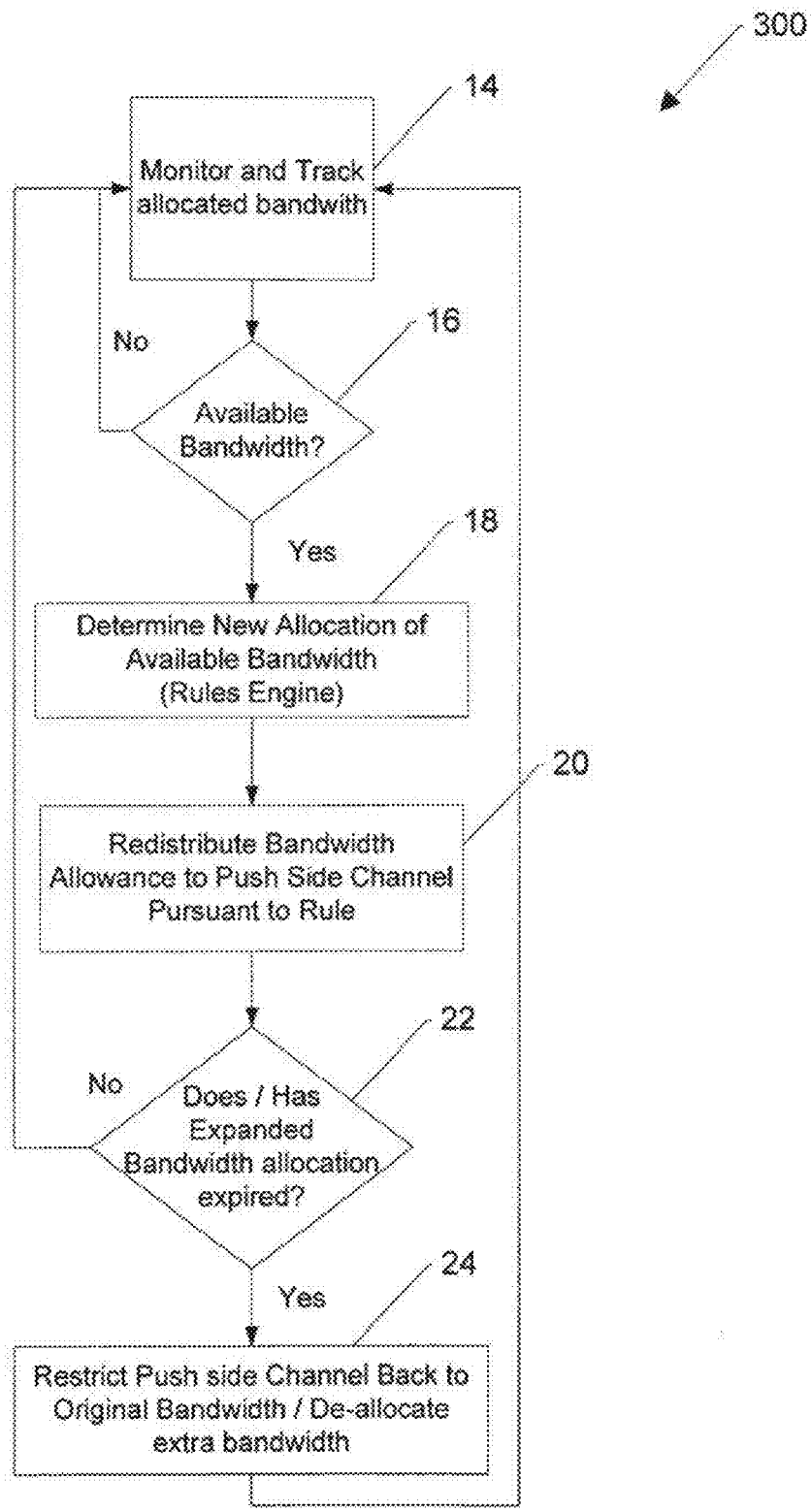
FIG. 3 is flow diagram of some of the steps of a method of dynamically allocating bandwidth in accordance with an embodiment of the invention.

According to one embodiment, as shown in FIG. 3, a method 300 fair dynamically allocating bandwidth on a push basis is provided. A monitoring agent tracks and monitors 14 the use of bandwidth within a service area. If a sufficient portion of bandwidth is or becomes available 16, the system consults the rules engine 18 to determine how to dynamically re-allocate the available bandwidth. Once a rule is determined, the system redistributes the available bandwidth 20 to the appropriate channel subject to the conditions set in the rules engine. As explained below, the rules and conditions may include, without limitation, time of day, time slot within the hour, nature of broadcast show, title of show, size of viewing audience, highest bidder/purchaser, time duration, etc. The system allows the re-allocated bandwidth to remain with the channel subject to the rules and conditions in the engine. If time limit or expiration date is set in the rule 22, upon expiration, the system pulls back or de-allocates the expanded bandwidth 24 from the channel and dynamically determines how to re-allocate it once again. The monitoring agent constantly evaluates and determines the availability of available bandwidth across the entire service area Some embodiments may use the additional bandwidth to enable the transmission of advanced advertising to a targeted audience. Systems and methods for assembling and delivering personalized or targeted messages (such as Intellispot advertisements and promotions offered by Visible World, Inc of New York, N.Y.) are described in commonly-owned, commonly-assigned U.S. patent application Ser. Nos. 09/545,015 and 09/545,524, which are hereby incorporated by reference in their entireties.

One embodiment of the invention dynamically creates individualized, multi-media messages that are delivered to specific target groups or individual viewers. A message, story, or advertisement is assembled on demand, based upon rules applied to each viewer's profile and a library of media segments. The framework for the final personalized message is a story or message template designed for a campaign. A set of viewer profiles is assembled from designated databases for each of the targeted entities. A collection of media segments is also created or selected and then made a available to produce the final personalized message at assembly time. Specific media segments are selected and merged according to the message template and information about the viewer derived from each viewer's profile. The information from the viewer profile is interpreted by a rule system to determine which of several potential media segments to select for use in the personalized message.

Figure 4:
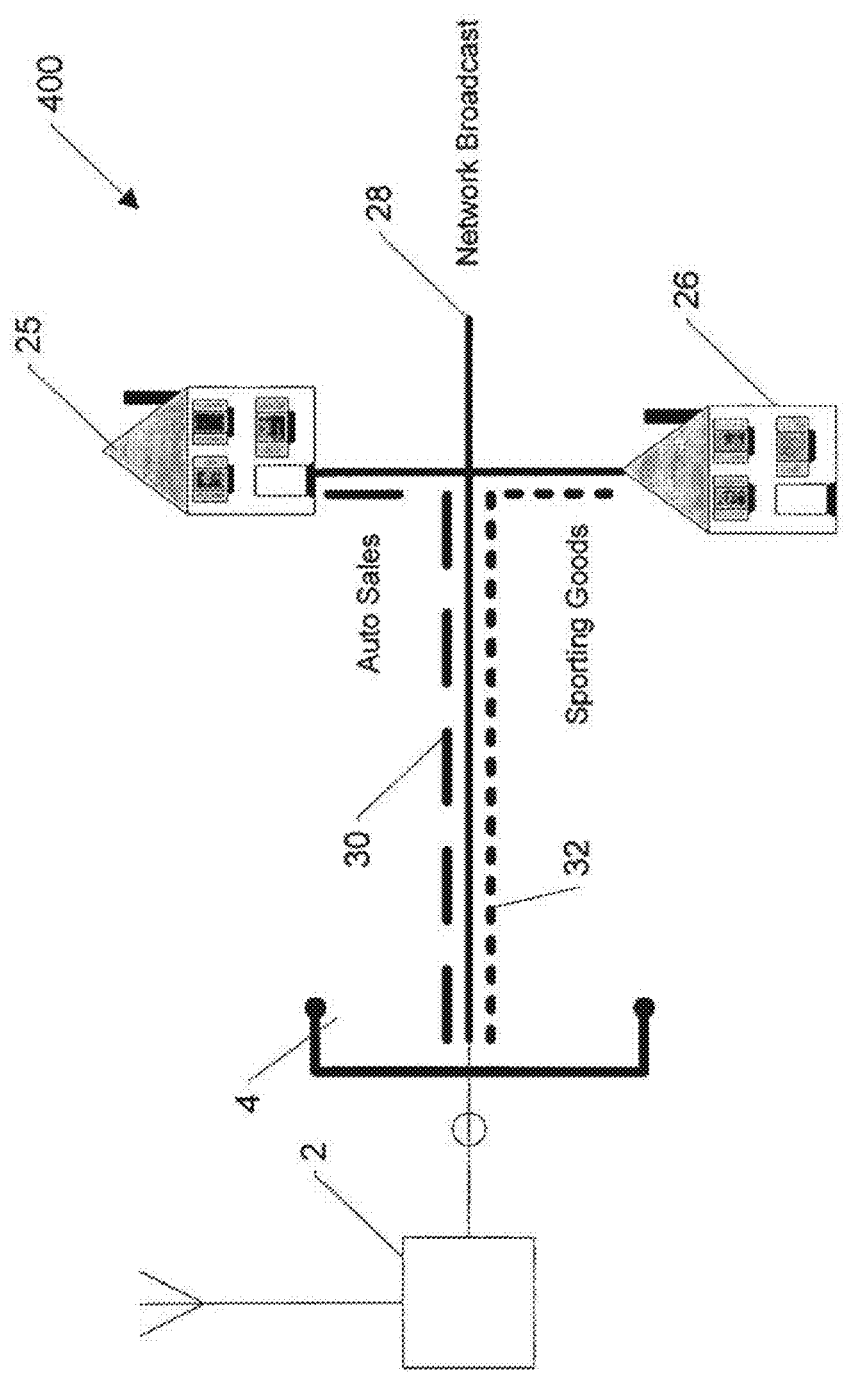
FIG. 4 is a diagram depicting the delivery of media content over an expanded bandwidth channel in accordance with an embodiment of the invention.

One embodiment of the invention, depicted in the diagram of FIG. 4, includes the simultaneous transmission of multiple possible advertising/promotional versions by expanding the available bit allocation beyond the program content that is associated with the advertisement. The availability of additional bits may be used for such transmissions whether the multiple versions of the advertisements are pre-constructed or are assembled upon final delivery (as with the Intellispot systems). For example, two subscriber neighbors 25, 26 in a single service area 400 may be viewing the same channel at the same time, a network broadcast 28 for example. Each subscriber, however, may be targeted by a different advertisement. The first subscriber 25 for example, may be a known automobile enthusiast, while the second subscriber 26 is a sports aficionado. With an expanded bandwidth 4 with which to provide an advertisement to a subscriber, the provider 2 can broadcast two advertisements simultaneously to two different set, top boxes. That is, the cable provider can push a targeted advertisement on automobile sales 30 to the first subscriber 25 while simultaneously pushing a targeted advertisement about sporting goods 32 to the second subscriber 26. Each subscriber is unaware of the head end processing and views the targeted advertising without any required action on their part.

One embodiment of the invention exploits the extra bandwidth of the cable operator allowing the bandwidth to be bid on or contracted for on a fixed or variable basis. Certain broadcast shows carry a significant opportunity for advertising due to large audiences, such as the Superbowl or other large sporting events. Additionally, certain time slots within a broadcast show are deemed to be more valuable than others due to the viewing habits of a typical user. For example, the top and the bottom of an hour are more desirable time slots for advertisers. The allocation of the extra bandwidth may be implemented on a protectible or pre-emptible basis, similarly to many established bandwidth markets. In one example, a programmer may expend significant finances to ensure maximum relevance of advertising and promotions delivered during primetime broadcasting hours by having pre-set bandwidth reserved and protected. Allowing bidding for such bandwidth, on a minute by minute basis for example, may result in the bandwidth priced at the top and bottom of an hour to be priced significantly differently than at other times during an hour. In addition, since some material can be pre-positioned in storage at the receiver side, such material may be sent at a discount, not requiring a real-time send. Further, since switched digital systems must be capable of registering the channel to which the subscriber has tuned, it is possible to extend such a system to further impact value by relating it to the number of viewers for a program. Accordingly, a cable operator may charge a program channel provider (e.g., CNN, ESPN, etc.) relative to each household which receives extra bandwidth for the advertisements and promotions. This ensures that costs are relative to the likely revenues derived, as well as incentivizing the cable operators by ensuring that bandwidth is allocated according to both direct and indirect demand.

Home electronics are increasingly being cross-implemented to increase the overlapping capabilities of each device. Digital cable set-top boxes are increasingly incorporating MPEG and IP modems. Television-like video displays are being attached to personal computers (PCs) and personal computers are increasingly incorporated into home theaters with a television, such a home theater personal computers ("HTPC"). According to another embodiment of the invention, it is possible to substantially supplement main MPEG-type program offerings, having associated material in real-time or near real-time, with carouseled and/or interactive material. Examples include sports broadcasts that have multiple camera angles and views that are not included with the main program view. The expanded bandwidth provides the opportunity for the cable provider to allow the subscriber to view and interactively select which camera angle or view to watch. Additionally, replays may be broadcast in an accompanying IP feed or stream within moments of a given play in any of the multiple camera angles that were not part of the received broadcast for the main program. According to one aspect of the embodiment, the transmission of supplemental IP content and program information in such an implementation is subject to the same nuances in pre-positioning certain material (e.g., player biographies which could be in full audio/video form) and measuring or monitoring which set-top boxes are watching certain programs in order to relate, track and set pricing on the supplementary program information. Further, such an implementation may incorporate the ability to pre-set return path bandwidth (i.e. a portion of the bandwidth dedicated to signals and information sent from the set-top box back to the cable provider) to ensure that if all available bandwidth was currently being used, the return bandwidth has already been allocated. One might consider such a return path pre-clearance as a "push" to "pull". For example, if all the program viewers in the service area were enticed at one moment to use their voice-over-IP ("VOIP") cable phones or otherwise all use their IP return at the same time, the pre-set return path as well as the downstream transmissions will not be interrupted due to a lack of available bandwidth; the bandwidth will have already been allocated.

As explained above, the tools enabling consumer demand to directly shape bandwidth allocation (pull basis) can be flipped in purpose and extended in multiple ways to enable bandwidth to be dynamically allocated among the cable providers instead. Such implementations may be used for both advertising and promotions versioning in order to increase relevance and to supplement main program offerings, in IP form, which may be directly transmitted with the main program offering. The joining of such supplemental IP material to the main program is ideal for an SDV system as it may require additional bandwidth use within the delivery system, since a separate, time-synched feed from a programmer's web site would chew up bandwidth on a traditional unicast basis. According to embodiments of the invention, such supplementary information tied into an MPEG transport may only consume bandwidth for the 1st viewer, and unlike unicast, none for the 2nd, etc.

Further, according to one embodiment, a receiver device and display device may jointly include the ability to store and/or display both MPEG and IP streams. In such a system, it is possible to instruct or direct the playing of program material to switch between one protocol and another in a similar fashion to mixing live and stored media for advertisements or other media that are stored on a DVR. Such arrangements could take the form of Intellispot advertisements, discussed above, which are transmitted by a server and assembled or pre-assembled at the server according to rules and meta-data corresponding to an IP capable receiver and played during a break in the MPEG transmission. Such an IP advertisement, could be constructed in real-time or pre-cached. Similarly, a supplementary IP feed might force a switch back to an MPEG advertisement or transmission that was already cached during a break in an IP transmission. Such an embodiment may be considered a mixed mode of "push" for IP and MPEG for any other two coder standards).

In some embodiments, in mixing pre-cached and real-time material for "push", some material may actually overlap due to the possibility that a real-time feed may not simply stop while a pre-cached advertisement or promotion runs, but rather while the pre-cache material runs, the real-time feed may have within it material which is used to update/modify the pre-cached material. For example, pricing meta-data may be incorporated within the real-time feed and determine the assembly/presentation of the pre-cached material.

While the invention has been described with reference to illustrative embodiments, it will be understood by those skilled in the art that various other changes, omissions and/or additions may be made and substantial equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method comprising:
monitoring an available capacity in a content delivery network configured to transmit a video stream and an Internet protocol (IP) stream to a plurality of receivers;
determining an amount of unused capacity within the delivery network;
dynamically reallocating, on a push basis, the unused capacity to the Internet protocol (IP) stream, the amount of unused capacity expanding the capacity of the Internet protocol (IP) stream; and
transmitting supplemental content in real-time or near real-time over the Internet protocol (IP) stream within the expanded capacity of the content delivery network;
wherein the supplemental content comprises interactive content;
wherein a return path bandwidth is pre-allocated and the unused capacity within the delivery network comprises bandwidth other than the pre-allocated return path bandwidth.

2. The method of claim 1, further comprising dynamically reallocating the amount of unused capacity based upon allocation criteria selected from the group consisting of: channel selection, time of day, expansion duration, expansion expiration, allocation for pre-purchased advertising, allocation for positioned advertising, allocation for multiple feeds, and allocation for internet protocol streams.

3. The method of claim 1, further comprising receiving a selection to view the supplemental content.

4. The method of claim 3, wherein the supplemental content comprises alternative views of a main broadcast program.

5. The method of claim 1, further comprising de-allocating the unused bandwidth responsive to expiration of a time limit.

6. The method of claim 1, wherein the video signals are configured to transmit MPEG signals.

7. The method of claim 1, wherein the interactive content comprises multiple camera angles.

8. The method of claim 1, wherein the return path bandwidth comprises a portion of bandwidth dedicated to signals and information sent from a set-top box back to the content delivery network.

9. A method comprising:
monitoring an available capacity in a content delivery network configured to transmit a video stream and an Internet protocol (IP) stream to a plurality of receivers;
determining an amount of unused capacity within the delivery network;
dynamically reallocating, on a push basis, the unused capacity to the Internet protocol (IP) stream, the amount of unused capacity expanding the capacity of the Internet protocol (IP) stream; and
transmitting supplemental content in real-time or near real-time over the Internet protocol (IP) stream within the expanded capacity of the content delivery network;
wherein a return path bandwidth is pre-allocated and the unused capacity within the delivery network comprises bandwidth other than the pre-allocated return path bandwidth.

10. The method of claim 9, further comprising dynamically reallocating the amount of unused capacity based upon allocation criteria selected from the group consisting of: channel selection, time of day, expansion duration, expansion expiration, allocation for pre-purchased advertising, allocation for positioned advertising, allocation for multiple feeds, and allocation for internet protocol streams.

11. The method of claim 9, further comprising receiving a selection to view the supplemental content.

12. The method of claim 11, wherein the supplemental content comprises alternative views of a main broadcast program.

13. The method of claim 9, further comprising de-allocating the unused bandwidth responsive to expiration of a time limit.

14. The method of claim 9, wherein the video signals are configured to transmit MPEG signals.

15. A system comprising a processor and a memory, the memory storing computer-executable instructions that, when executed by the processor, cause the system to perform operations comprising:
monitoring an available capacity in a content delivery network configured to transmit a video stream and an Internet protocol (IP) stream to a plurality of receivers;
determining an amount of unused capacity within the delivery network;
dynamically reallocating, on a push basis, the unused capacity to the Internet protocol (IP) stream, the amount of unused capacity expanding the capacity of the Internet protocol (IP) stream; and
transmitting supplemental content in real-time or near real-time over the Internet protocol (IP) stream within the expanded capacity of the content delivery network;
wherein a return path bandwidth is pre-allocated and the unused capacity within the delivery network comprises bandwidth other than the pre-allocated return path bandwidth.

16. The system of claim 15, further comprising dynamically reallocating the amount of unused capacity based upon allocation criteria selected from the group consisting of: channel selection, time of day, expansion duration, expansion expiration, allocation for pre-purchased advertising, allocation for positioned advertising, allocation for multiple feeds, and allocation for internet protocol streams.

17. The system of claim 15, further comprising receiving a selection to view the supplemental content.

18. The system of claim 17, wherein the supplemental content comprises alternative views of a main broadcast program.

19. The system of claim 15, further comprising de-allocating the unused bandwidth responsive to expiration of a time limit.

20. The system of claim 15, wherein the video signals are configured to transmit MPEG signals.

21. The system of claim 15, wherein the interactive content comprises multiple camera angles.

22. The system of claim 15, wherein the return path bandwidth comprises a portion of bandwidth dedicated to signals and information sent from a set-top box back to the content delivery network.

* * * * *